US007940869B2

(12) United States Patent
Tandai et al.

(10) Patent No.: US 7,940,869 B2
(45) Date of Patent: May 10, 2011

(54) RADIO COMMUNICATION METHOD, SYSTEM AND A TERMINAL STATION

(75) Inventors: Tomoya Tandai, Tokyo (JP); Tomoko Adachi, Urayasu (JP); Yoriko Utsunomiya, Tokyo (JP); Daisuke Takeda, Kawasaki (JP); Kazumi Sato, Kawasaki (JP); Koji Ogura, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1499 days.

(21) Appl. No.: 11/345,488

(22) Filed: Feb. 2, 2006

(65) Prior Publication Data

US 2006/0192708 A1 Aug. 31, 2006

(30) Foreign Application Priority Data

Feb. 4, 2005 (JP) ................................. 2005-028964

(51) Int. Cl.
*H03D 1/04* (2006.01)
*H03D 1/06* (2006.01)
*H03K 5/01* (2006.01)
*H03K 6/04* (2006.01)
*H04B 1/10* (2006.01)
*H04L 1/00* (2006.01)
*H04L 25/08* (2006.01)

(52) U.S. Cl. ....... 375/346; 375/358; 375/377; 455/63.3; 455/67.13; 455/450; 370/330; 370/431; 342/52; 342/57

(58) Field of Classification Search .......... 370/445–448, 370/431, 455, 310, 328–330, 336–338; 455/450–451, 343, 67.13, 67.11, 39, 63.1, 455/63.3, 445–448; 375/316, 346–347, 351; 342/52, 57–58

See application file for complete search history.

(56) References Cited

U.S. PATENT DOCUMENTS 7,400,612 B2 * 7/2008 Yamaura ....................... 370/338
7,545,308 B2 * 6/2009 Mitsugi ........................... 342/52

(Continued)

FOREIGN PATENT DOCUMENTS

| JP | 05-130053 | 5/1993 |
| JP | 2001-285301 | 10/2001 |
| JP | 2001-333081 | 11/2001 |
| JP | 2002-135831 | 5/2002 |

(Continued)

OTHER PUBLICATIONS

U.S. Appl. No. 11/557,636, filed Nov. 8, 2006, Takagi et al.

*Primary Examiner* — David C. Payne
*Assistant Examiner* — James M Perez
(74) *Attorney, Agent, or Firm* — Oblon, Spivak, McClelland, Maier & Neustadt, L.L.P.

(57) ABSTRACT

Radio communication system includes terminal including unit detecting radar wave transmitted through second-frequency channel, first-and-second-frequency channels through which radar wave fails to be transmitted being simultaneously utilized or one of first-and-second-frequency channels being utilized, unit generating radar-detection information including information indicating detection time when detecting unit detects radar wave, and information indicating frequency channel through which radar wave is transmitted, and unit transmitting radar-detection information, and base station including unit receiving radar-detection information, unit generating radar-occurrence information based on received-radar-detection information, radar-occurrence information including information indicating occurrence time when radar wave occurs, information indicating period of occurrence of radar wave, and information indicating frequency channel through which radar wave is transmitted, and unit transmitting radar-occurrence information, terminal further including unit receiving radar-occurrence information, and unit communicating with other terminals through second-frequency channel without using base station when radar wave fails to occur, based on received-radar-occurrence information.

6 Claims, 16 Drawing Sheets

U.S. PATENT DOCUMENTS

| | | | |
|---|---|---|---|
| 2003/0169697 A1* | 9/2003 | Suzuki et al. | 370/310 |
| 2004/0048609 A1* | 3/2004 | Kosaka | 455/422.1 |
| 2004/0137849 A1* | 7/2004 | Kloper et al. | 455/67.11 |
| 2004/0157580 A1* | 8/2004 | Stadelmeier et al. | 455/338 |
| 2005/0032524 A1* | 2/2005 | Kruys et al. | 455/454 |
| 2005/0282551 A1 | 12/2005 | Tandai et al. | |

FOREIGN PATENT DOCUMENTS

| | | |
|---|---|---|
| JP | 2003-249939 | 9/2003 |
| JP | 2004-535095 | 11/2004 |
| WO | WO 02/082844 A2 | 10/2002 |
| WO | WO 02/082844 A3 | 10/2002 |
| WO | WO 03/030577 A1 | 4/2003 |

* cited by examiner

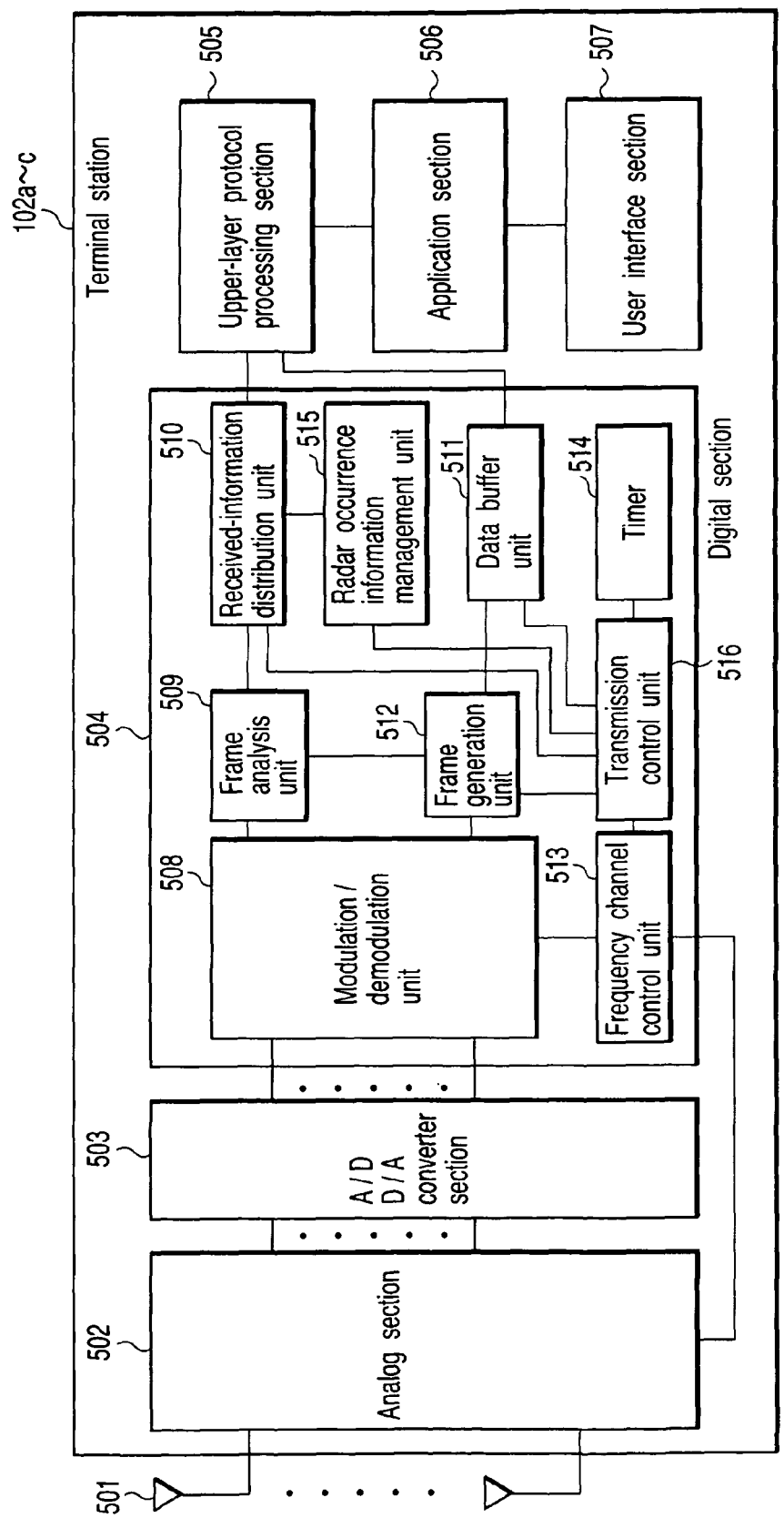
F I G. 5

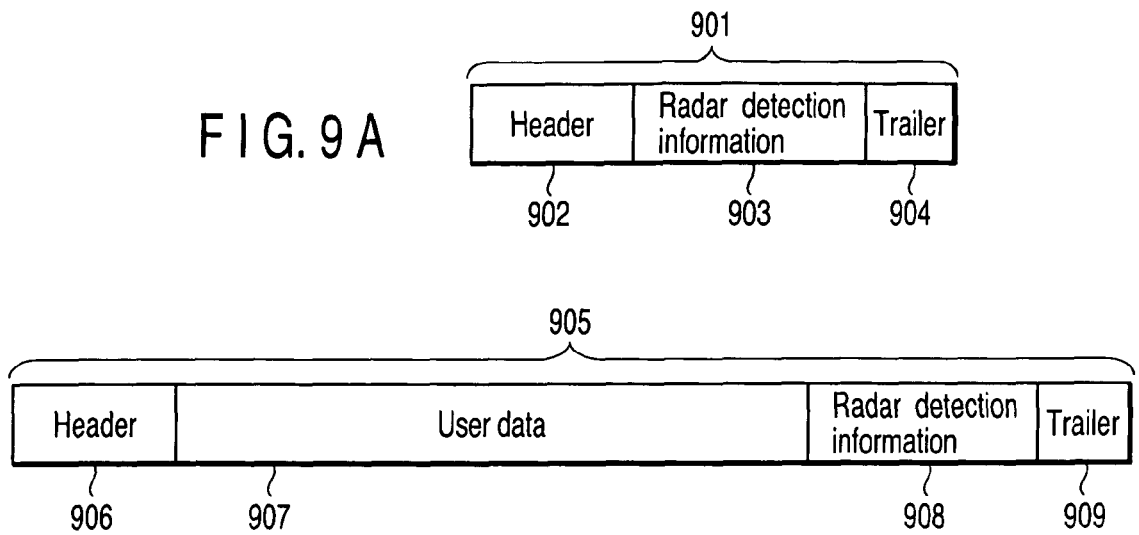
FIG. 9A
FIG. 9B
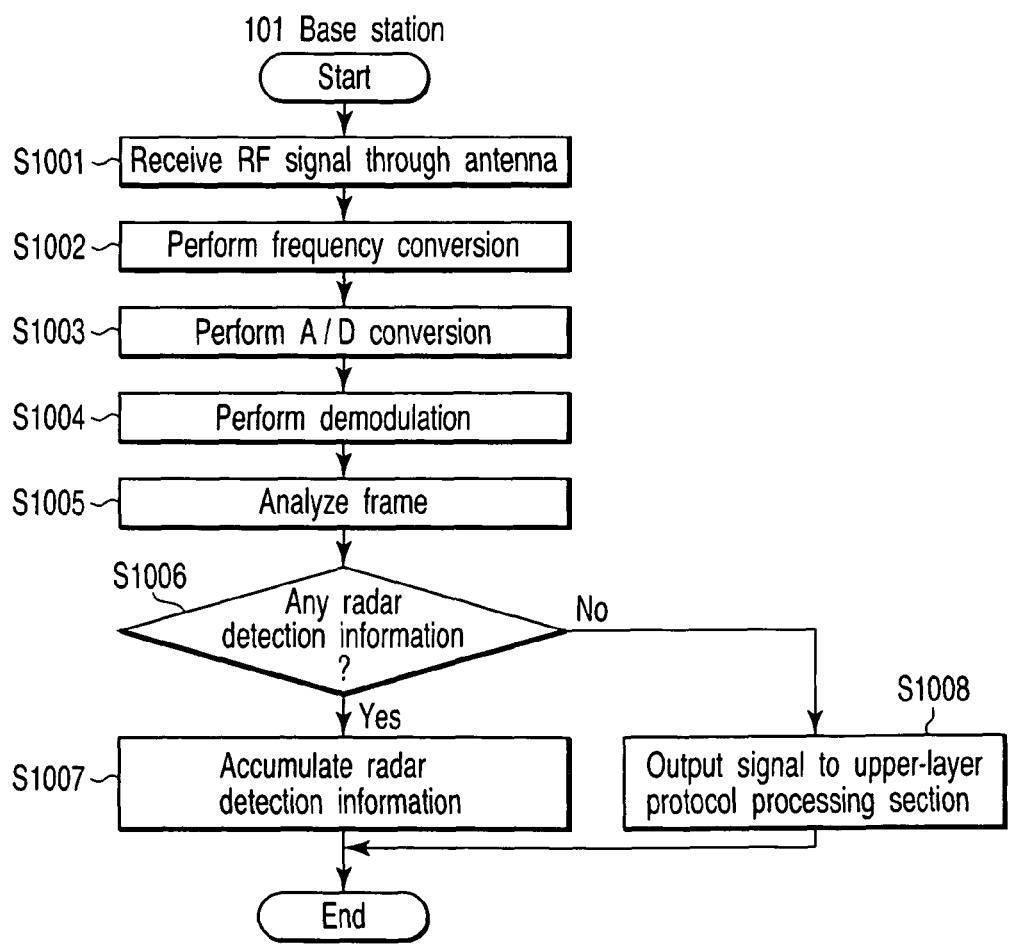
FIG. 10

FIG. 19

| ID | Occurrence time | Duration time | Occurrence period |
|---|---|---|---|
| 1902 | 1903 | 1904 | 1905 |

| ID | Terminal station ID | Occurrence time | Duration time | ID | Terminal station ID | Occurrence time | Duration time |
|---|---|---|---|---|---|---|---|
| 2004 | 2005 | 2006 | 2007 | 2008 | 2009 | 2010 | 2011 |

2002 — 2003

2001

US 7,940,869 B2

RADIO COMMUNICATION METHOD, SYSTEM AND A TERMINAL STATION

CROSS-REFERENCE TO RELATED APPLICATIONS

This application is based upon and claims the benefit of priority from prior Japanese Patent Application No. 2005-028964, filed Feb. 4, 2005, the entire contents of which are incorporated herein by reference.

BACKGROUND OF THE INVENTION

1. Field of the Invention

The present invention relates to a radio communication method, system and a terminal in which a plurality of radio communication devices interactively perform radio communication using a plurality of frequency channels in common.

2. Description of the Related Art

There is a conventional radio communication system, in which radio communication devices perform radio communication, using two frequency bands in common. In a conventional radio communication system of this type, while terminal stations are connected to a base station via a first frequency channel, they also utilize a second frequency channel to perform communication therebetween in an ad-hoc mode during a beacon interval (see, for example, Jpn. Pat. Appln. KOKAI Publication No. 2003-249939).

In the above-described conventional technique, when a radar wave is transmitted through the second frequency channel, if terminal stations use the second frequency channel for communication, the radar wave may be interfered.

BRIEF SUMMARY OF THE INVENTION

In accordance with an aspect of the invention, there is provided a radio communication system comprising:

a first terminal station including: a detection unit configured to detect a radar wave transmitted through a second frequency channel, a first frequency channel and the second frequency channel through which the radar wave fails to be transmitted being simultaneously utilized or one of the first frequency channel and the second frequency channel being utilized; a detection information generation unit configured to generate radar detection information including information indicating a detection time when the detection unit detects the radar wave, and information indicating the frequency channel through which the radar wave is transmitted; and a detection information transmission unit configured to transmit the radar detection information; and a base station including: a detection information receiving unit configured to receive the radar detection information; an occurrence information generation unit configured to generate radar occurrence information based on the received radar detection information, the radar occurrence information including information indicating an occurrence time when the radar wave occurs, information indicating a period of occurrence of the radar wave, and information indicating the frequency channel through which the radar wave is transmitted; and an occurrence information transmission unit configured to transmit the radar occurrence information, the first terminal station further including: an occurrence information receiving unit configured to receive the radar occurrence information; and a communication unit configured to communicate with other first terminal stations through the second frequency channel without using the base station when the radar wave fails to occur, based on the received radar occurrence information.

In accordance with another aspect of the invention, there is provided a radio communication method comprising: detecting, in a first terminal station, a radar wave transmitted through a second frequency channel, a first frequency channel and the second frequency channel through which the radar wave fails to be transmitted being simultaneously utilized or one of the first frequency channel and the second frequency channel being utilized; generating, in the first terminal station, radar detection information including information indicating a detection time when detecting the radar wave, and information indicating the frequency channel through which the radar wave is transmitted; and transmitting the radar detection information from the first terminal station; receiving the radar detection information by a base station; generating radar occurrence information by the base station based on the received radar detection information, the radar occurrence information including information indicating an occurrence time when the radar wave occurs, information indicating a period of occurrence of the radar wave, and information indicating the frequency channel through which the radar wave is transmitted; transmitting the radar occurrence information from the base station; receiving the radar occurrence information by the first terminal station; and accessing other first terminal stations by the first terminal station through the second frequency channel when the radar wave fails to occur, based on the received radar occurrence information, without using the base station.

In accordance with still another aspect of the invention, there is provided a terminal station comprising: a detection unit configured to detect a radar wave transmitted through a second frequency channel, a first frequency channel and the second frequency channel through which the radar wave fails to be transmitted being simultaneously utilized or one of the first frequency channel and the second frequency channel being utilized; a detection information generation unit configured to generate radar detection information including information indicating a detection time when the detection unit detects the radar wave, and information indicating the frequency channel through which the radar wave is transmitted; a detection information transmission unit configured to transmit the radar detection information; an occurrence information receiving unit configured to receive a radar occurrence information transmitted from a base station, which is adaptable to the receiving unit, the radar occurrence information being including information indicating an occurrence time when the radar wave occurs, information indicating a period of occurrence of the radar wave, and information indicating the frequency channel through which the radar wave is transmitted; and a communication unit configured to communicate with other terminal stations through the second frequency channel without using the base station when the radar wave fails to occur, based on the received radar occurrence information.

In accordance with yet another aspect of the invention, there is provided a radio communication method comprising: detecting, in a terminal station, a radar wave transmitted through a second frequency channel, a first frequency channel and the second frequency channel through which the radar wave fails to be transmitted being simultaneously utilized or one of the first frequency channel and the second frequency channel being utilized; generating, in the terminal station, radar detection information including information indicating a detection time when the detection unit detects the radar wave, and information indicating the frequency channel through which the radar wave is transmitted; transmitting the radar detection information from the terminal station; receiving a radar occurrence information transmitted from a base station, which is adaptable to the terminal station, the radar occurrence information being including information indicating an occurrence time when the radar wave occurs, information indicating a period of occurrence of the radar wave, and information indicating the frequency channel through which the radar wave is transmitted; and communicating with other terminal stations through the second frequency channel without using the base station when the radar wave fails to occur, based on the received radar occurrence information.

BRIEF DESCRIPTION OF THE SEVERAL VIEWS OF THE DRAWING

FIG. 5 is a block diagram illustrating an example of a first terminal station according to the embodiment;

FIG. 9A is a view illustrating a format example of a frame containing only radar detection information and transmitted by the first terminal station;

FIG. 9B is a view illustrating a format example of a frame containing radar detection information and user data and transmitted by the first terminal station;

FIG. 10 is a flowchart illustrating a process example performed from the time when the base station of FIG. 3 receives a frame, to the time when it generates radar occurrence information;

FIG. 19 is a view illustrating another format example of the radar occurrence information element transmitted by the base station; and FIG. 20 is a view illustrating a format example of radar occurrence information transmitted by the base station.

DETAILED DESCRIPTION OF THE INVENTION

Referring to the accompanying drawings, a detailed description will be given of a radio communication method, system and a terminal according to an embodiment of the invention.

The embodiment of the invention aims to provide a radio communication method, system and a terminal that exhibit a high efficiency of use of frequencies and do not interfere with radar waves.

Figure 1:
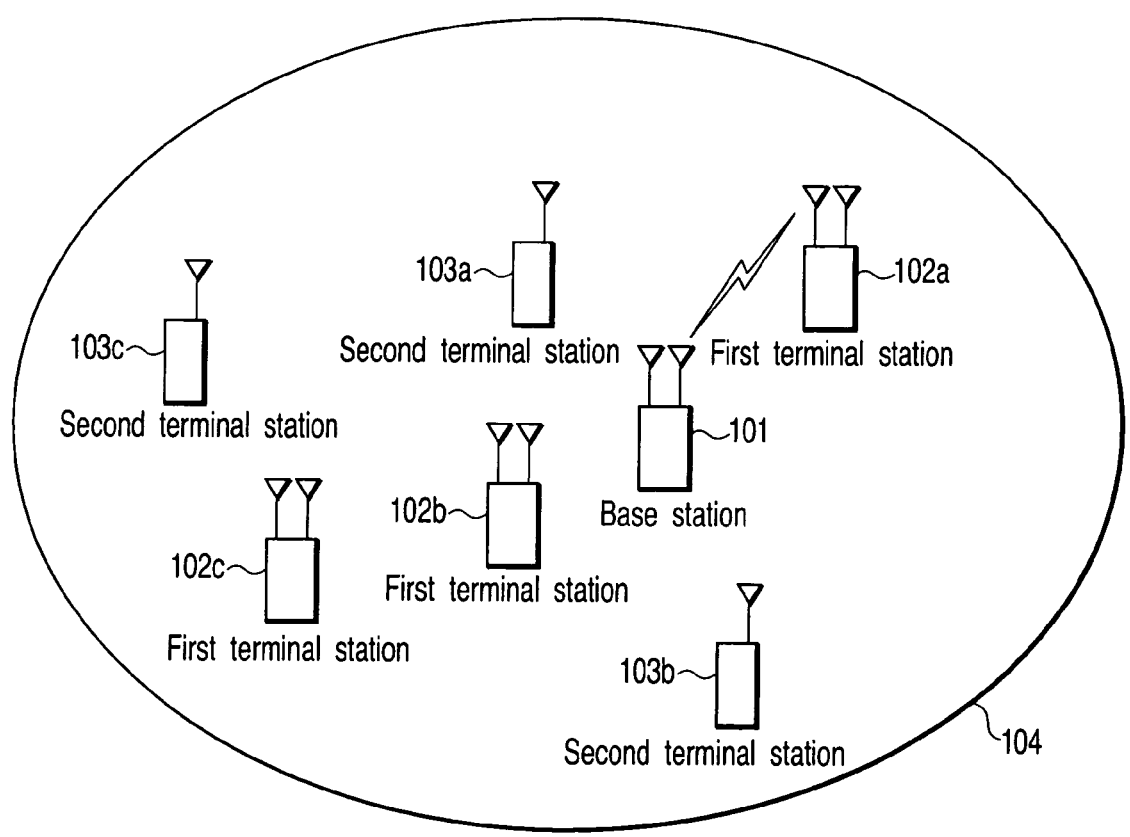
FIG. 1 is a schematic view illustrating a radio communication system according to the embodiment, which are provided with a base station and a plurality of terminal stations.

FIG. 1 is a schematic view illustrating a radio communication system 104 according to the embodiment, which is provided with a base station 101, first terminal stations 102a, 102b and 102c, and second terminal stations 103a, 103b and 103c, between which radio communications are performed.

As shown in FIG. 1, the base station 101 performs radio communication with the first terminal stations 102a, 102b and 102c and second terminal stations 103a, 103b and 103c, using two frequency channels in common. Further, the first terminal stations 102a, 102b and 102c and second terminal stations 103a, 103b and 103c can directly communicate with each other without the base station 101. In the case of FIG. 1, there are provided three first terminal stations 102a, 102b and 102c and three second terminal stations 103a, 103b and 103c. However, the numbers of the first and second terminal stations are not limited to three.

Figure 2A:
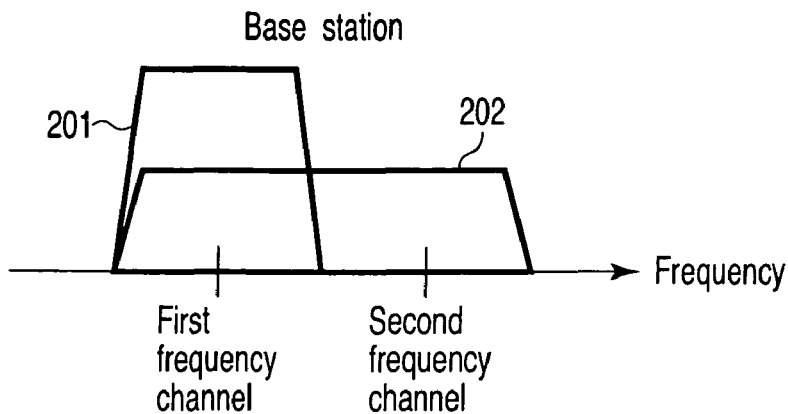
FIG. 2A is a view illustrating frequency channels used by the base station appearing in FIG. 1.
Figure 2B:
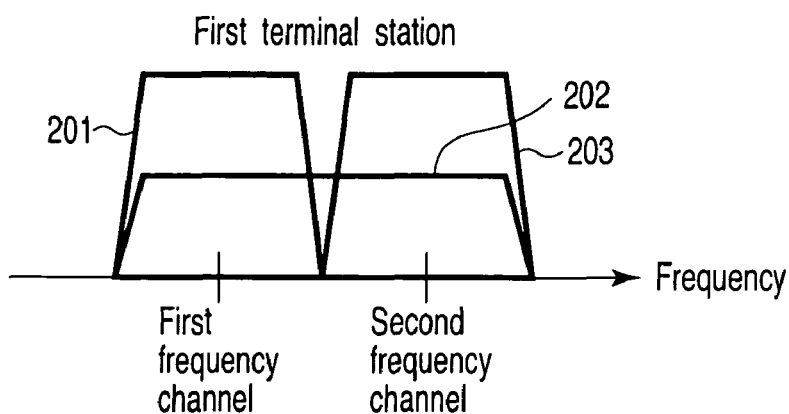
FIG. 2B is a view illustrating frequency channels used by the first terminal stations appearing in FIG. 1.
Figure 2C:
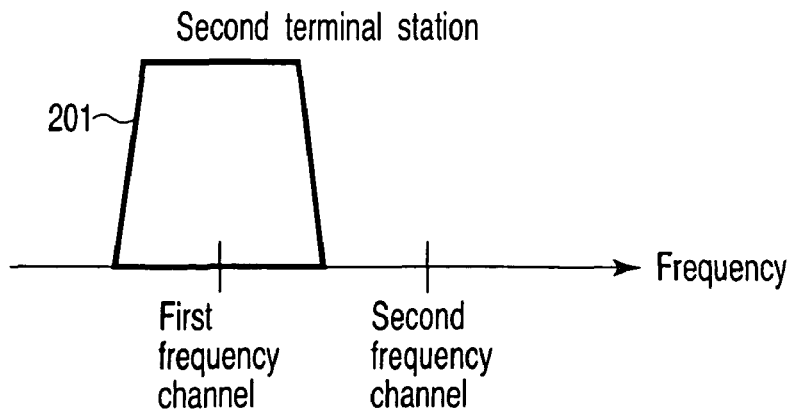
FIG. 2C is a view illustrating frequency channels used by the second terminal stations appearing in FIG. 1.

FIGS. 2A to 2C schematically show examples of frequency channels employed in the embodiment. Specifically, FIG. 2A shows frequency channels used by the base station 101. As shown in FIG. 2A, the base station 101 selects and uses a first frequency channel or simultaneously uses both first and second frequency channels in accordance with time, as indicated by reference numeral 201 or 202.

FIG. 2B shows frequency channels used by the first terminal stations 102a, 102b and 102c. As shown in FIG. 2B, the first terminal stations 102a, 102b and 102c select and use the first frequency channel or second frequency channel, or simultaneously use both the first and second frequency channels, in accordance with time, as indicated by reference numeral 201, 203 or 202.

FIG. 2C is a view illustrating frequency channels used by the second terminal stations 103a, 103b and 103c. As shown in FIG. 2C, the second terminal stations 103a, 103b and 103c use the first frequency channel as indicated by reference numeral 201.

Although in the above, the first and second frequency channels 201 and 203 are adjacent to each other, it is not always necessary to make the first and second frequency channels 201 and 203 adjacent to each other.

In the embodiment described below, first and second frequency channels 201 and 203 are adjacent to each other.

(Base Station)

Figure 3:
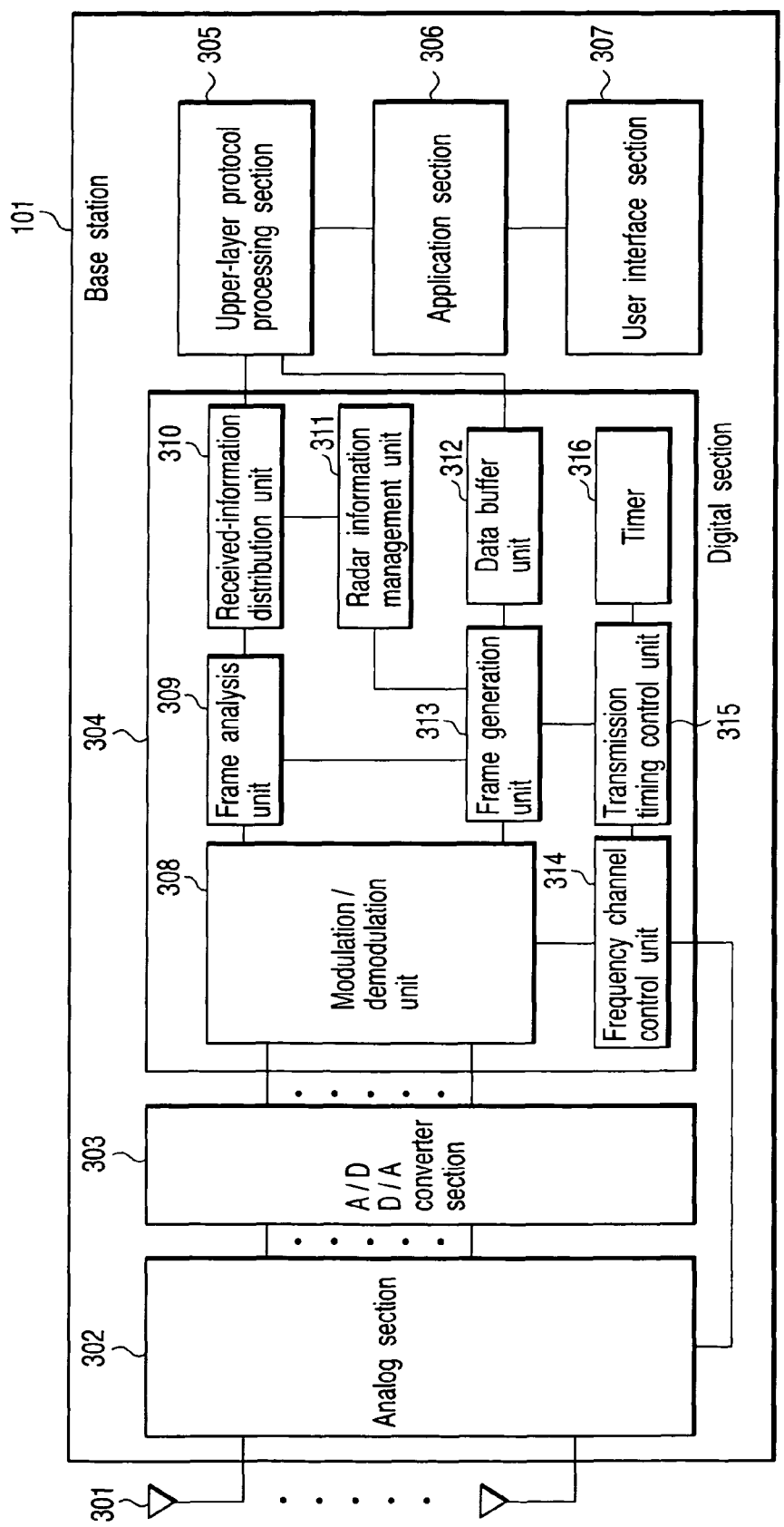
FIG. 3 is a block diagram illustrating a base station according to an embodiment of the invention.

FIG. 3 is a block diagram illustrating an internal configuration example of the base station 101 according to the embodiment of the invention.

As shown, the base station 101 comprises one or more antennas 301, analog section 302, A/D•D/A converter section 303, digital section 304, upper-layer protocol processing section 305, application section 306 and user interface section 307. The digital section 304 includes a modulation/demodulation unit 308, frame analysis unit 309, received-information distribution unit 310, radar information management unit 311, data buffer unit 312, frame generation unit 313, frequency channel control unit 314, transmission timing control unit 315 and timer 316.

Each antenna 301 transmits and receives an RF signal. The analog section 302 performs frequency conversion between the RF signal and the baseband signal. The A/D•D/A converter section 303 performs analog-to-digital and digital-to-analog conversion. The digital section 304 performs digital signal processing. The upper-layer protocol processing section 305 processes upper-layer protocols. The application section 306 processes applications. The user interface section 307 interfaces the base station with their operators.

The modulation/demodulation unit 308 performs modulation/demodulation processing. The frame analysis unit 309 analyzes each received frame. The received-information distribution unit 310 distributes received information.

The radar information management unit 311 manages radar information. Specifically, the radar information management unit 311 stores radar detection information indicating when and in which frequency channel a radar wave occurs. For instance, it periodically updates the radar detection information.

The data buffer unit 312 performs buffering of transmission data.

The frame generation unit 313 generates transmission frames. Specifically, the frame generation unit 313 inquires whether the radar information management unit 311 stores radar detection information that indicate the time when and the frequency channel in which each radar wave is detected in the service area of the base station 101. Based on the radar detection information, the frame generation unit 313 generates a frame that contains radar occurrence information. The radar occurrence information includes information indicating the time when a radar wave occurs, information indicating the period of occurrence of the radar wave, and information indicating the frequency channel in which the radar wave occurs.

The frequency channel control unit 314 performs frequency channel control. The transmission timing control unit 315 performs timing control of transmission frames. The timer 316 measures a preset time, and reports it to the timing control unit 315.

Figure 4:
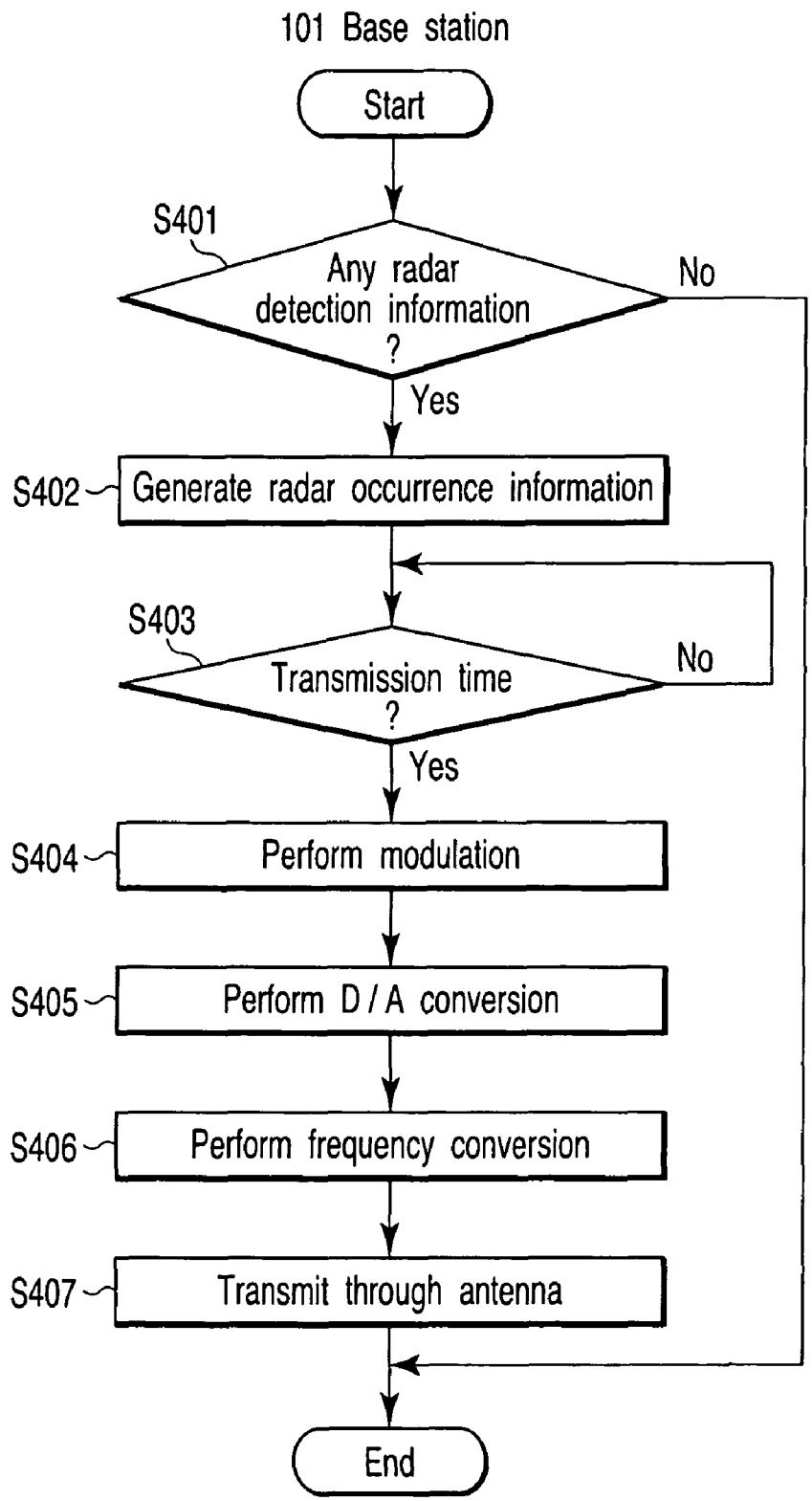
FIG. 4 is a flowchart useful in explaining a process example for reporting occurrence of a radar wave, performed by the base station of FIG. 3 after starting communication.

FIG. 4 is a flowchart useful in explaining a process example for reporting occurrence of a radar wave, performed by the base station 101 after starting communication.

The frame generation unit 313 inquires whether the radar information management unit 311 stores radar detection information that indicates the time when and the frequency channel in which a radar wave is detected in the service area of the base station 101 (step S401). If the radar detection information is stored, the program proceeds to step S402, whereas if it is not stored, the report process is finished. Assume here that the base station 101 acquires radar detection information by some means. For instance, assume that the base station 101 acquires radar detection information from a terminal station. This operation will be described later with reference to FIG. 10. Alternatively, the base station 101 itself may acquire radar detection information by frequency scanning, which will be described later with reference to FIG. 15.

At step S402, the frame generation unit 313 generates a frame containing radar occurrence information, based on the radar detection information. After that, the frame generation unit 313 waits for a transmission start signal supplied from the transmission timing control unit 315 (step S403). Upon receiving the transmission start signal from the transmission timing control unit 315, the frame generation unit 313 outputs the frame, containing the radar occurrence information, to the modulation/demodulation unit 308, where the transmission frame is modulated (step S404).

The A/D•D/A converter section 303 converts the modulated transmission frame as a digital signal into an analog signal (step S405). The analog section 302 frequency-converts the transmission frame as the analog signal into an RF signal (step S406). The RF signal is broadcasted from one of the antennas 301 (step S407).

(First Terminal Station)

FIG. 5 is a block diagram illustrating each of the first terminal stations 102a, 102b and 102c employed in the embodiment.

As shown in FIG. 5, each of the first terminal stations 102a, 102b and 102c comprises one or more antennas 501, analog section 502, A/D•D/A converter section 503, digital section 504, upper-layer protocol processing section 505, application section 506 and user interface section 507. The digital section 504 includes a modulation/demodulation unit 508, frame analysis unit 509, received-information distribution unit 510, radar-occurrence-information management unit 515, data buffer unit 511, frame generation unit 512, frequency channel control unit 513, transmission control unit 516 and timer 514.

Each antenna 501 transmits and receives an RF signal. The analog section 502 performs frequency conversion between the RF signal and the baseband signal. The A/D•D/A converter section 503 performs analog-to-digital and digital-to-analog conversion. The digital section 504 performs digital signal processing. The upper-layer protocol processing section 505 processes upper-layer protocols. The application section 506 processes applications. The user interface section 507 interfaces the terminal station with its user.

The modulation/demodulation unit 508 performs modulation/demodulation processing. The frame analysis unit 509 analyzes each received frame. The received-information distribution unit 510 distributes received information. The data buffer unit 511 performs buffering of transmission data. The frame generation unit 512 generates transmission frames. The frequency channel control unit 513 controls frequency channels. The transmission control unit 516 performs timing control of transmission frames. The timer 514 measures a preset time and reports it to the transmission control unit 516. The transmission control unit 516 is connected to the received-information distribution unit 510, radar-occurrence-information management unit 515 and data buffer unit 511. The transmission control unit 516 monitors whether the data buffer unit 511 stores transmission data, and performs transmission processing if the transmission data exists. The transmission control unit 516 determines, from the information received by the received-information distribution unit 510, whether communication based on direct link protocol (DLP) is performed between terminal stations, using the second frequency channel.

The radar-occurrence-information management unit 515 stores the radar occurrence information broadcasted by the base station 101.

Figure 6:
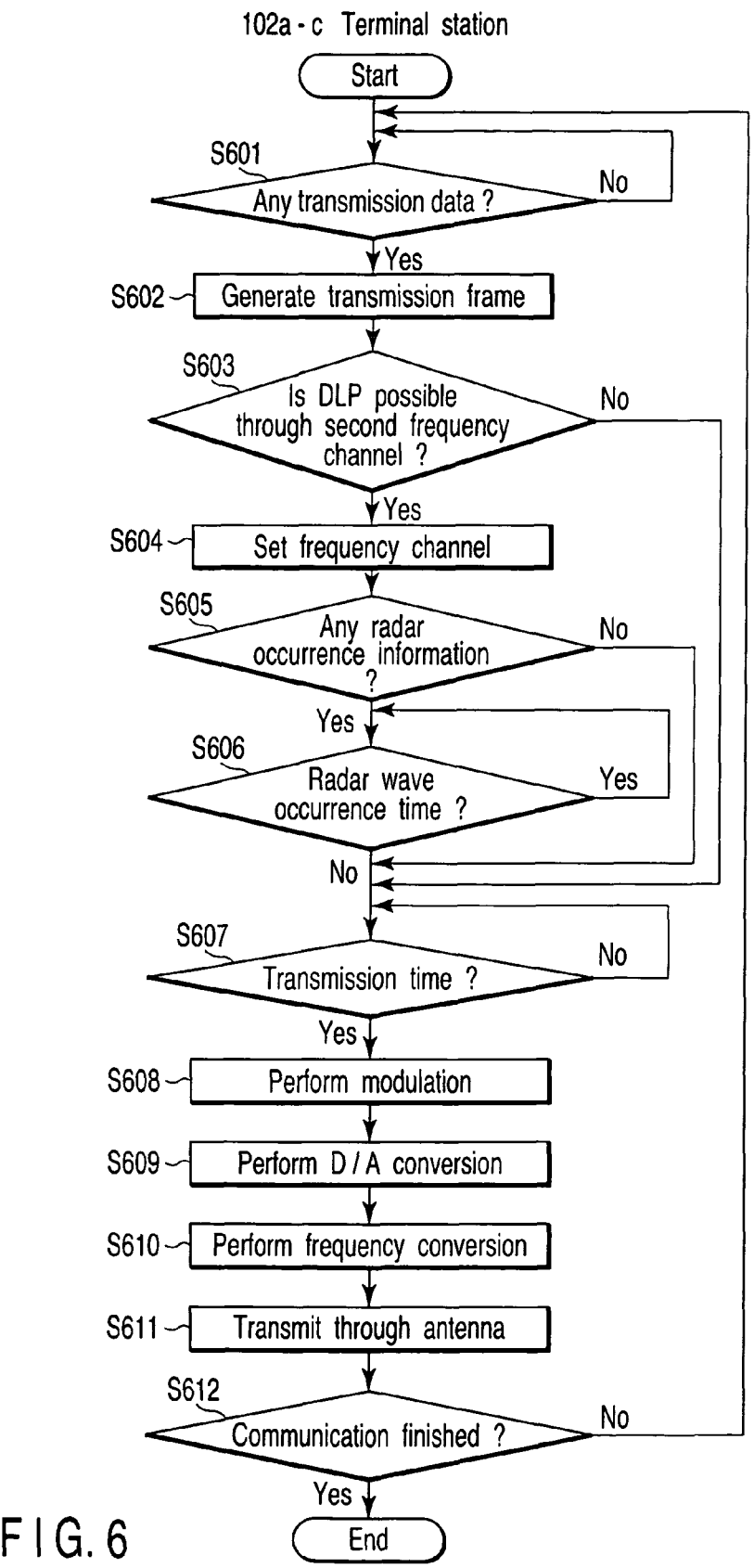
FIG. 6 is a flowchart illustrating a process example for transmitting a frame, performed by the first terminal station of FIG. 5 after finishing, for example, a registration process.

FIG. 6 is a flowchart illustrating a process example for transmitting a frame, performed by each of the first terminal stations 102a, 102b and 102c after finishing a registration process.

The transmission control unit 516 inquires of the data buffer unit 511 whether it contains transmission data (step S601). If there is no transmission data, the transmission control unit 516 iterates step S601, whereas if there is transmission data, the program proceeds to step S602. At step S602, the transmission control unit 516 issues, to the frame generation unit 512, an instruction to generate a transmission frame, whereby the frame generation unit 512 generates a transmission frame. At step S603, the transmission control unit 516 determines whether communication based on direct link protocol (DLP) is possible between terminal stations, using the second frequency channel. If communication based on DLP is possible using the second frequency channel, the program proceeds to step S604, whereas if communication based on DLP is impossible using the second frequency channel, the program proceeds to step S607, where the time when a transmission frame is to be transmitted is waited for.

The transmission control unit 516 issues an instruction to switch the frequency channel to the frequency channel control unit 513. The frequency channel control unit 513, in turn, performs frequency channel setting so that communication can be performed using the second frequency channel (step S604). Subsequently, the transmission control unit 516 inquires of the radar-occurrence-information management unit 515 whether there is radar occurrence information that indicates occurrence of a radar wave in the second frequency channel (step S605). If the radar occurrence information exists, the time when a radar wave occurs is avoided (step S606), and the time when data transmission is to be performed is waited for (step S607). Namely, each terminal station transmits data when no radar wave occurs. If there is no radar occurrence information at step S605, the time of transmission is simply waited for (step S607).

When the preset time is reached, the frame generation unit 512 outputs a transmission frame to the modulation/demodulation unit 508 in response to the instruction from the transmission control unit 516, and the modulation/demodulation unit 508 modulates the transmission frame (step S608). The A/D•D/A converter section 503 converts the modulated transmission frame as a digital signal into an analog signal (step S609). The resultant transmission frame as the analog signal is frequency-converted into an RF signal by the analog section 502 (step S610). The antenna 501 broadcasts the RF signal (step S611).

Steps S601 to S612 are iterated until communication is finished.

In the above-described embodiment, even in a frequency channel in which a radar wave can occur, communication can be performed to avoid the time when the radar wave occurs, therefore the efficiency of use of the frequency channel can be enhanced without interfering with the radar wave.

(Modification of First Terminal Station)

Figure 7:
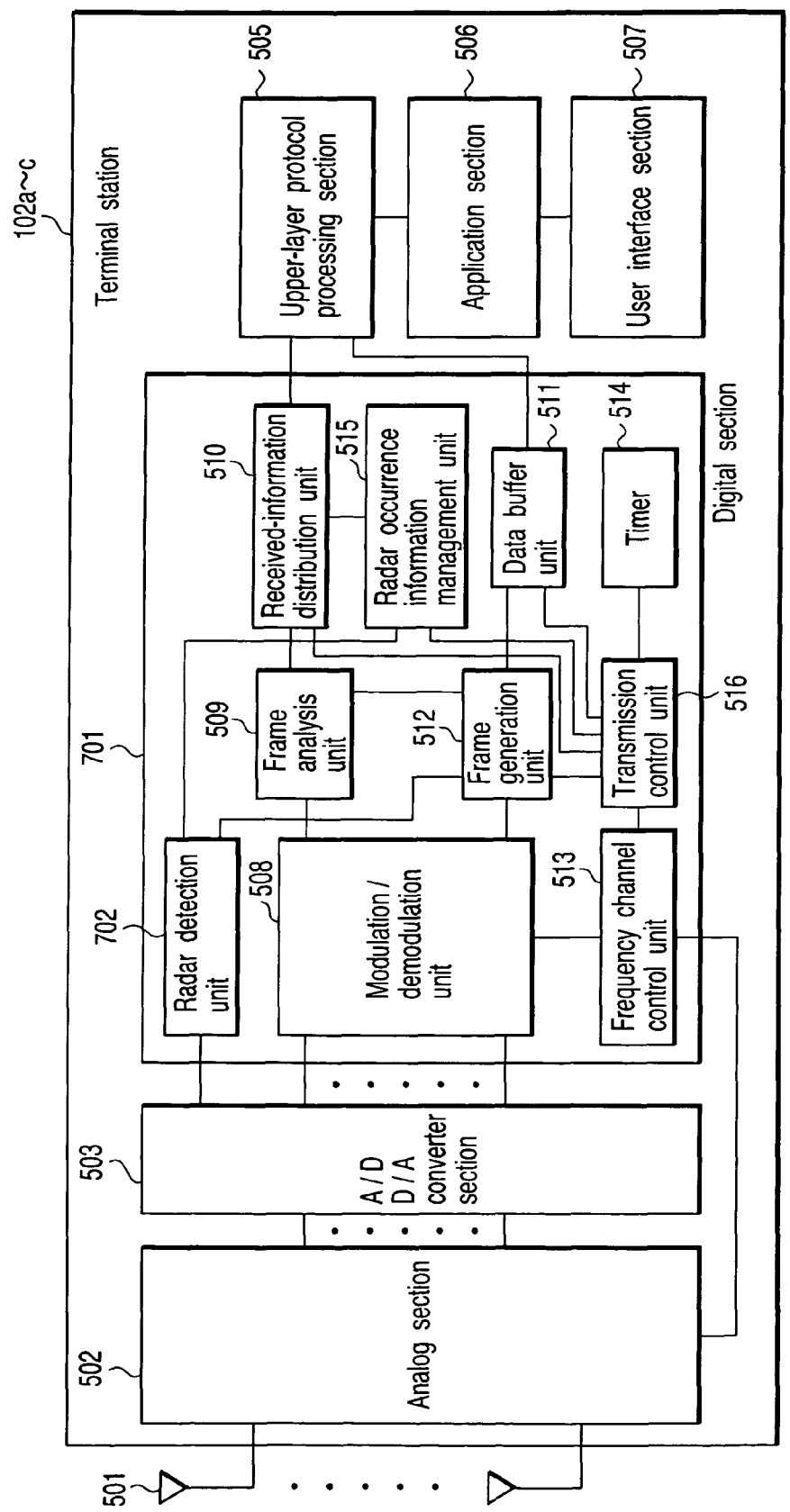
FIG. 7 is a block diagram illustrating an example of a first terminal station according to a modification of FIG. 5.

FIG. 7 is a block diagram illustrating a modification of each first terminal station 102a, 102b or 102c of FIG. 5. In FIGS. 5 and 7, like reference numerals denote like elements, and duplication of description will be avoided.

A radar detection unit 702 detects a radar wave and outputs radar detection information to the frame generation unit 512. The first terminal stations 102a, 102b and 102c transmit the radar detection information to the base station 101.

Figure 8:
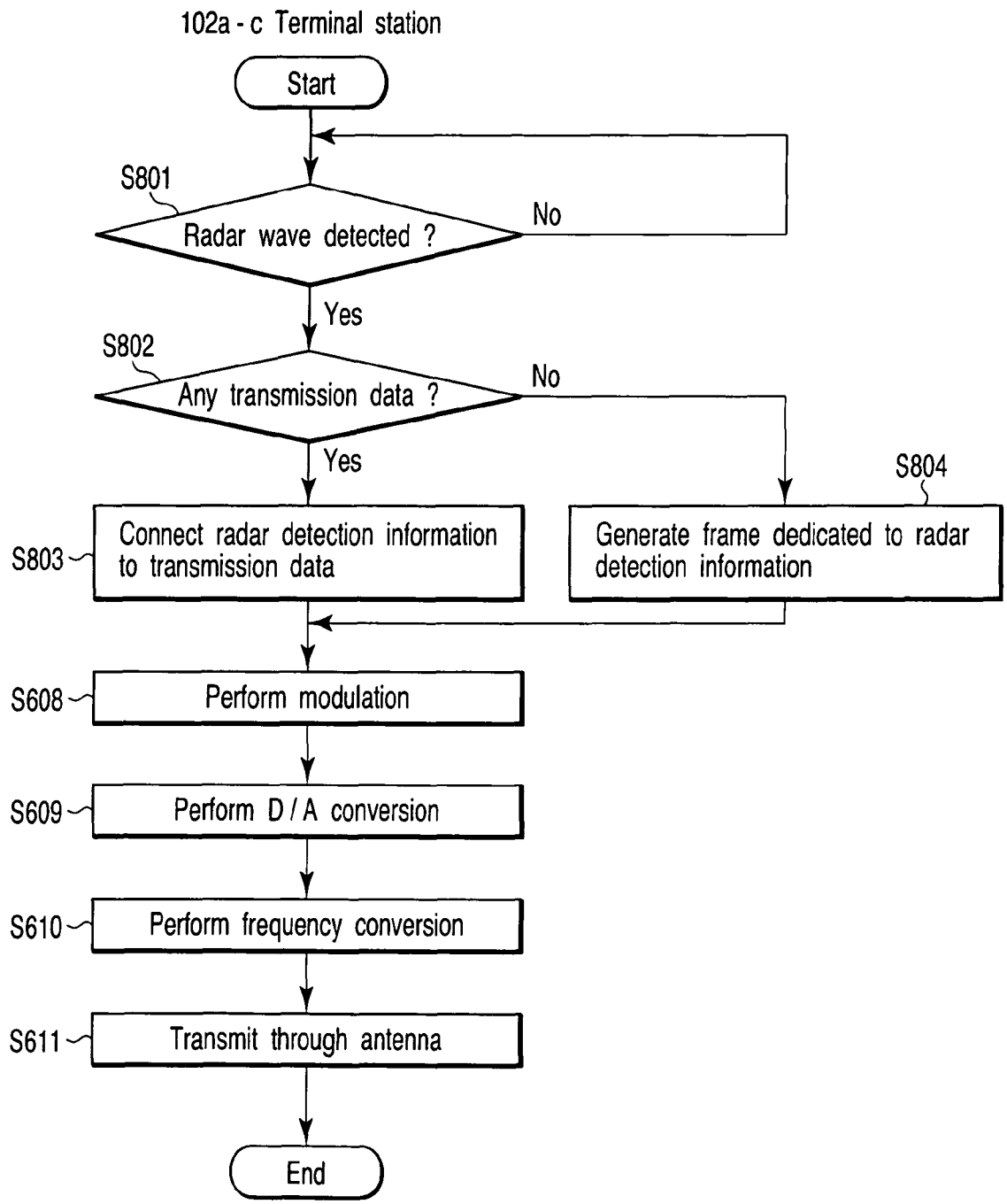
FIG. 8 is a flowchart illustrating a process example performed by the first terminal station of FIG. 7 for transmitting radar detection information to a base station.

FIG. 8 is a flowchart illustrating a process example performed by each first terminal station 102a, 102b or 102c of FIG. 7 for transmitting radar detection information to the base station 101.

The radar detection unit 702 determines whether each antenna 501 has received a radar wave (step S801). If the radar detection unit 702 determines that a radar wave is received, it outputs radar detection information to the frame generation unit 512. The frame generation unit 512 inquires of the data buffer unit 511 whether transmission data exists (step S802). If transmission data exists, the program proceeds to step S803, whereas if no transmission data exists, the program proceeds to step S804. In this embodiment, the radar detection unit 702 generates radar detection information. Alternatively, the radar detection unit 702 may supply the frame generation unit 512 with information indicating the time when and the frequency channel in which a radar wave is detected, and the frame generation unit 512 may generate radar detection information.

At step S803, the transmission control unit 516 connects the radar detection information to the transmission data. At step S804, a frame containing only the radar detection information is generated. The frame generated at step S803 or S804 is input to the modulation/demodulation unit 508, where it is modulated (step S608). The following steps are similar to those of FIG. 6.

FIGS. 9A and 9B show format examples of a frame containing radar detection information and transmitted by each first terminal station 102a, 102b or 102c.

The frame 901 shown in FIG. 9A employs a frame format that contains radar detection information 903 as a single element, as well as a header 902 and trailer 904.

The frame 905 shown in FIG. 9B employs a frame format that contains radar detection information 908 and user data 907 connected thereto, as well as a header 906 and trailer 909.

Although in the case of FIG. 9B, the radar detection information and user data are connected to each other, the data, to which the radar detection information is connected, is not limited to the user data, but may be management data or control data.

As described above, when a terminal station transmits radar detection information, if any other to-be-transmitted data exists, overhead can be suppressed by connecting the radar detection information to the data. In contrast, when a terminal station transmits radar detection information, if no other to-be-transmitted data exists, detection of a radar wave can be reported quickly by transmitting only the radar detection information. Thus, each terminal station can appropriately transmit the radar detection information in accordance with the conditions.

Radar detection information may be transmitted, simultaneously using the first and second frequency channels, or only using the first frequency channel. In the description below, assume that the first and second frequency channels are each set to have a band of 20 MHz. Further, the case where the first and second frequency channels are simultaneously used will be referred to as communication using 40 MHz, and the case where only the first frequency channel is used will be referred to as communication using first 20 MHz.

FIG. 10 is a flowchart illustrating a process example performed from the time when the base station 101 of the embodiment receives a frame, to the time when it generates radar occurrence information. Also in this process, the base station 101 has the internal configuration shown in FIG. 3.

The antenna 301 receives an RF signal (step S1001). The analog section 302 frequency-converts the RF signal into a baseband signal (step S1002). The A/D•D/A converter section 303 converts the baseband signal as an analog signal into a digital signal, and outputs it to the modulation/demodulation unit 308 (step S1003). The modulation/demodulation unit 308 demodulates the signal and outputs the resultant signal to the frame analysis unit 309 (step S1004).

The frame analysis unit 309 performs frame analysis, and outputs the received information to the received-information distribution unit 310 (step S1005). The received-information distribution unit 310 determines whether the received information contains radar detection information (step S1006). If the radar detection information is contained, the program proceeds to step S1007, whereas if it is not contained, the program proceeds to step S1008. At step S1007, the radar information management unit 311 receives radar detection information from the received-information distribution unit 310 and stores it. At step S1008, the received-information distribution unit 310 outputs the received information to the upper-layer protocol processing section 305.

As described above, since radar detection information is received from at least one first terminal station that is performing communication using the second frequency channel, reliable and accurate radar occurrence information can be generated.

Figure 11:
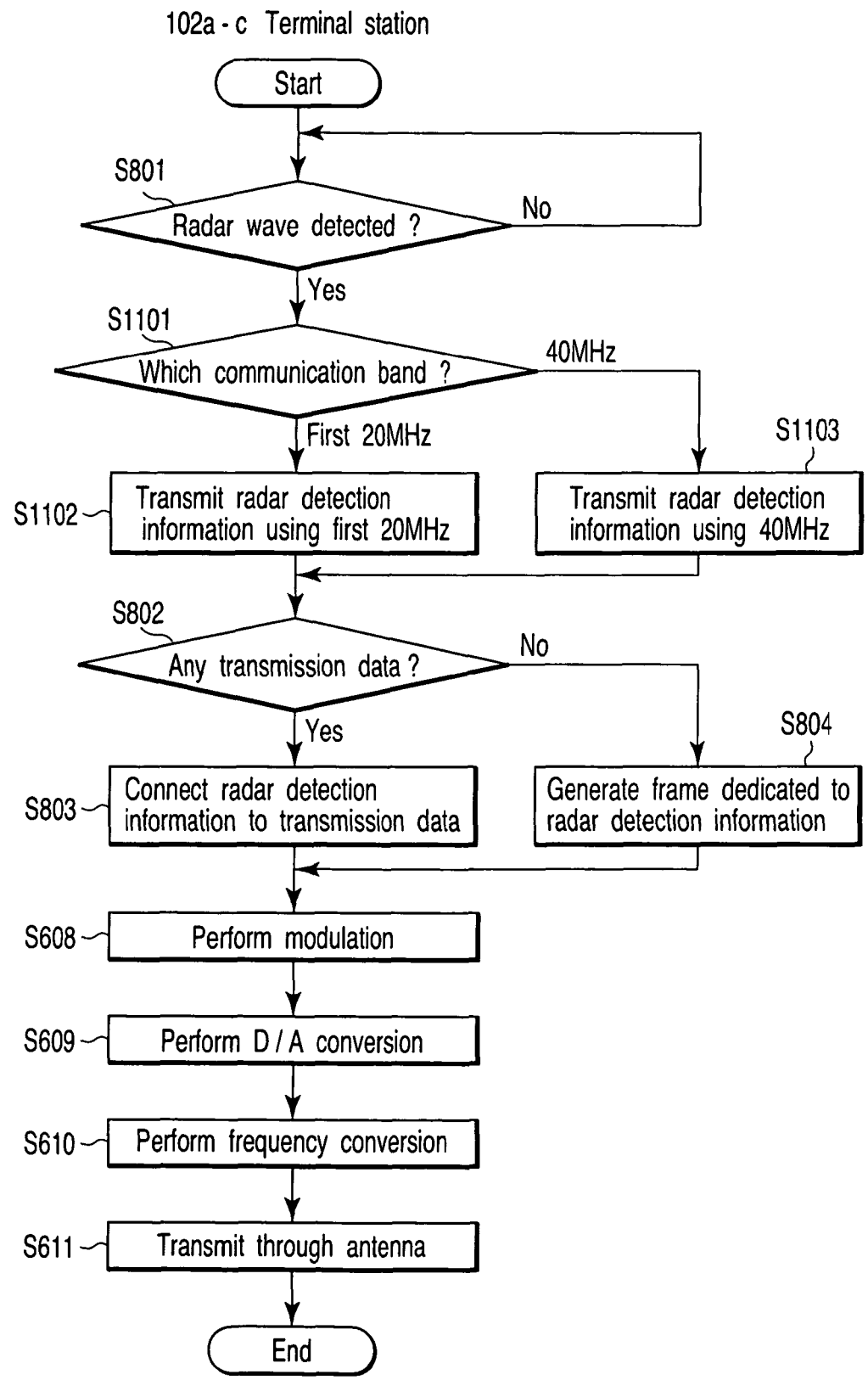
FIG. 11 is a flowchart illustrating a process example performed by the first terminal station of FIG. 7 until it transmits radar detection information to the base station.

FIG. 11 is a flowchart illustrating a process example performed by each first terminal station 102a, 102b or 102c of FIG. 7 until it transmits radar detection information to the base station 101. This process example differs from that of FIG. 8. In FIG. 11, elements similar to those in FIG. 6 or 8 are denoted by corresponding reference numerals, and no description is given thereof.

Upon detecting a radar wave (step S801), the radar detection unit 702 outputs radar detection information to the frame generation unit 512. The frame generation unit 512, in turn, inquires of the transmission control unit 516 the present communication band. If the present communication band is of first 20 MHz, the program proceeds to step S1102, whereas if the present communication band is of 40 MHz, the program proceeds to step S1103. At step S1102, the frame generation unit 512 determines to transmit the radar detection information using first 20 MHz. At step S1103, the frame generation unit 512 determines to transmit the radar detection information using 40 MHz.

Thus, since radar detection information is transmitted through the currently used communication band when a radar wave is detected, the detection of the radar wave can be reported without delay.

The radar detection information transmitted at a time by each first terminal station 102a, 102b or 102c may contain a plurality of radar detection information elements.

Figure 12:
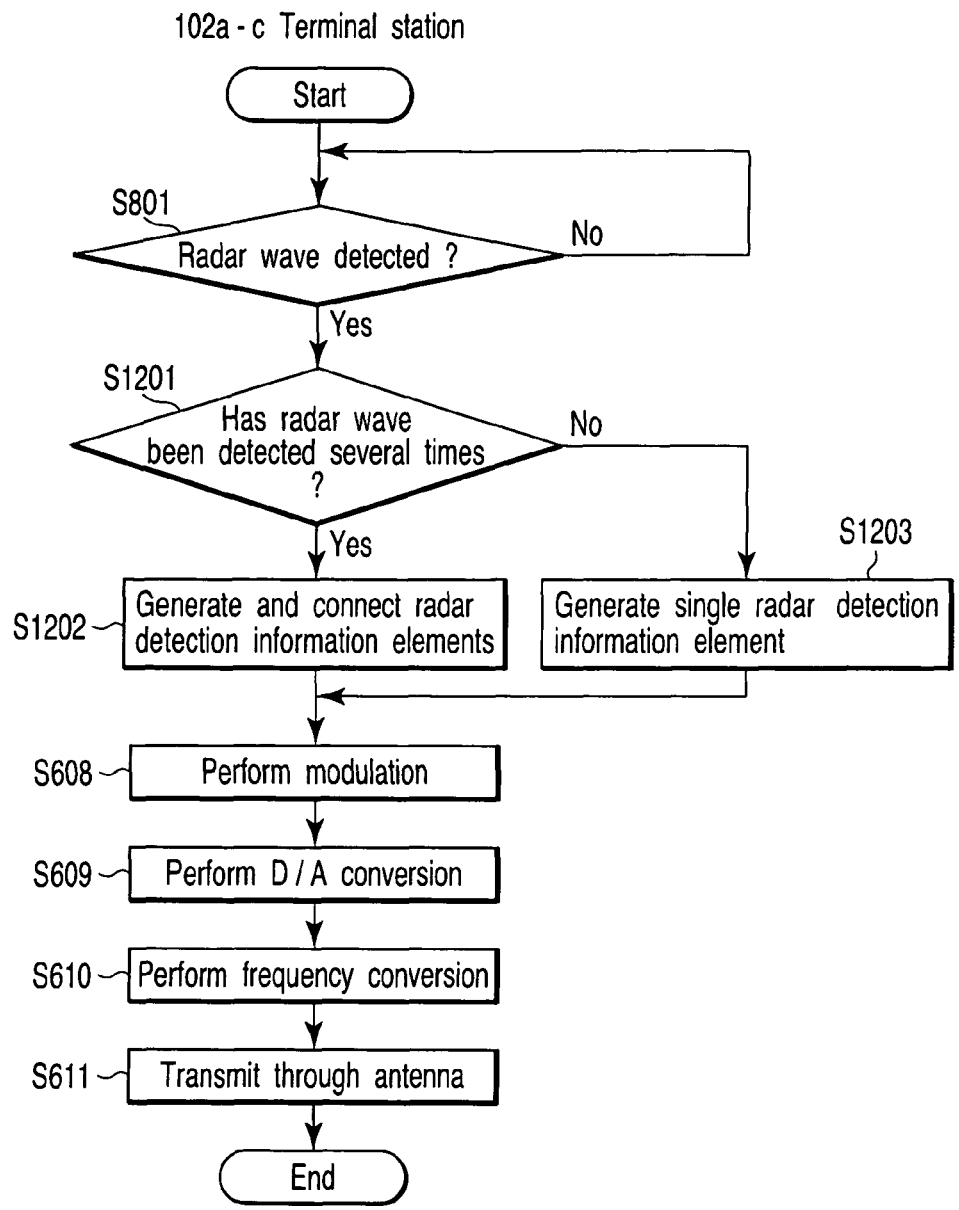
FIG. 12 is a flowchart illustrating another process example performed by the first terminal station of FIG. 7 until it transmits radar detection information to the base station.

FIG. 12 is a flowchart illustrating another process example performed by each first terminal station 102a, 102b or 102c of FIG. 7 until it transmits radar detection information to the base station 101. This process example differs from those of FIGS. 8 and 11. In FIG. 12, elements similar to those in FIG. 6 or 8 are denoted by corresponding reference numerals, and no description is given thereof.

Each time a radar wave is detected (step S801), the radar detection unit 702 outputs information concerning the radar wave to the frame generation unit 512. The frame generation unit 512 counts the number of receptions of information concerning the radar wave from the radar detection unit 702 (step S1201).

If the frame generation unit 512 receives a plurality of radar detection information items, the program proceeds to step S1202, whereas if it receives only a single radar detection information item, the program proceeds to step S1203. At step S1202, the frame generation unit 512 generates radar detection information elements corresponding to respective received radar detection information items, and couples the radar detection information elements into radar detection information. At step S1203, the frame generation unit 512 generates radar detection information corresponding to the single radar detection information item.

As described above, efficient supply of radar detection information can be realized by transmitting, at a time, information indicating a plurality of radar detections.

Figure 13:
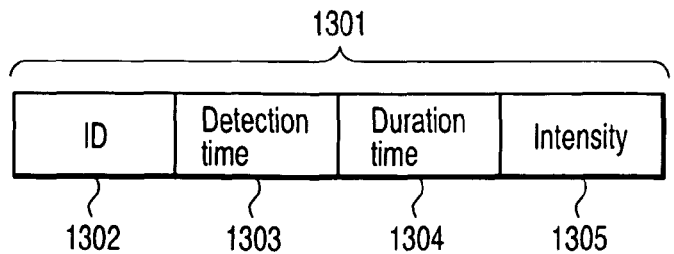
FIG. 13 is a view illustrating a format example of a radar detection information element transmitted by the first terminal station of FIG. 7.

FIG. 13 is a view illustrating a format example of a radar detection information element transmitted by each first terminal station 102a, 102b or 102c of FIG. 7.

The format 1301 for a radar detection information element, shown in FIG. 13, comprises "ID" 1302 for identifying the radar detection information element, "Detection Time" 1303 indicating the time when the radar wave indicated by the information element is detected, "Duration Time" 1304 indicating the time during which the occurrence of the radar wave continues, and "Intensity" 1305 indicating the intensity of the radar wave. "Detection Time" 1303 may be the value of, for example, a timing synchronization function (TSF) timer. "Duration Time" 1304 indicates the time during which, for example, a radar wave of a preset intensity or more occurs. "Intensity" 1305 indicates, for example, an average radar-wave intensity acquired when a radar wave of a preset intensity or more occurs.

As described above, since each terminal station supplies the base station with radar detection information as detailed information concerning the detected radar wave, the base station can provide accurate radar occurrence information.

(Modification of Base Station)

Figure 14:
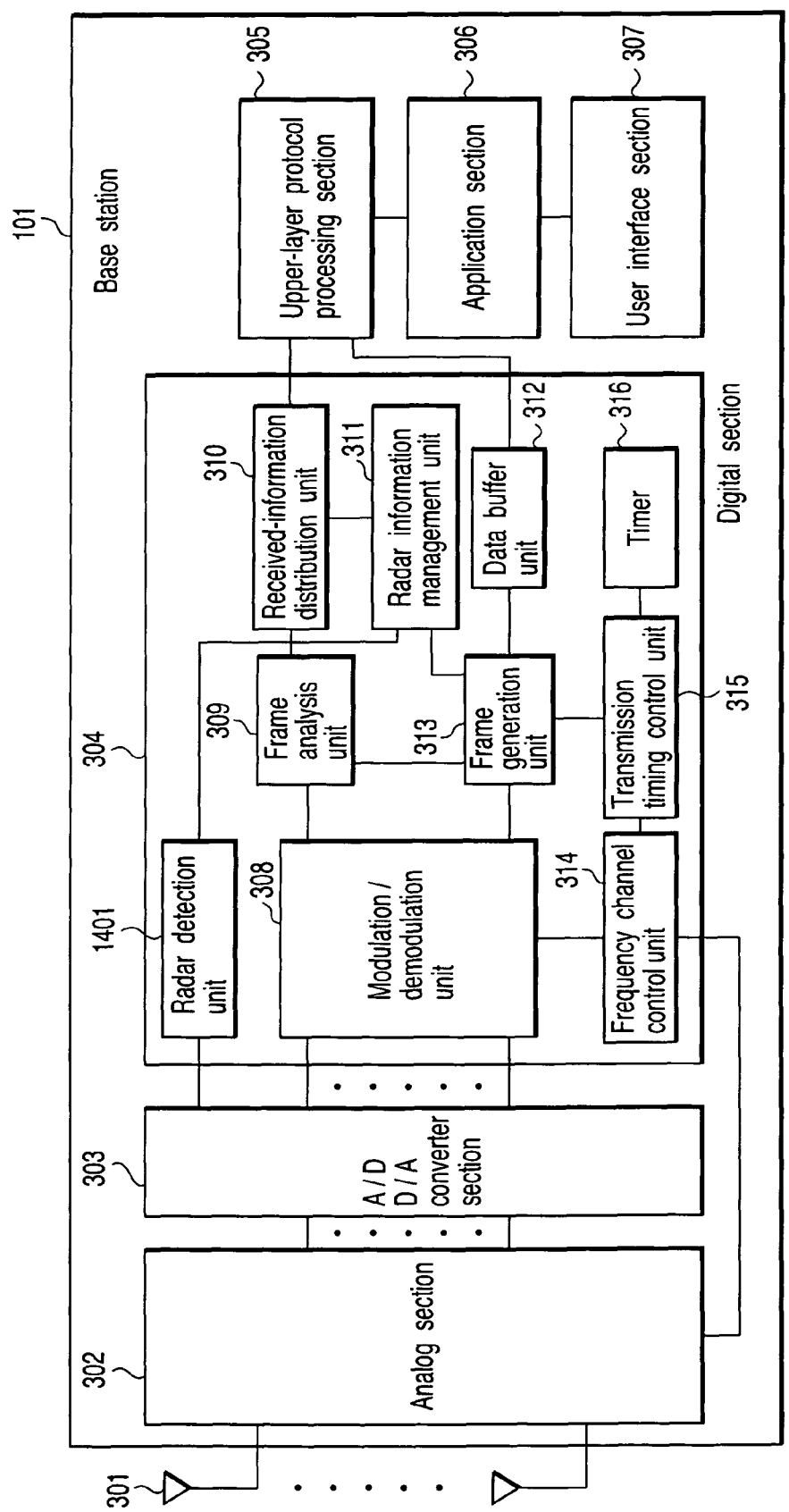
FIG. 14 is a block diagram illustrating a base station according to a modification of FIG. 3.

FIG. 14 is a block diagram illustrating a base station 101 according to a modification of FIG. 3. This modification is acquired by adding a radar detection unit 1401 to the base station of FIG. 3. In FIGS. 3 and 14, like reference numeral denote like elements, and no description is given thereof.

Figure 15:
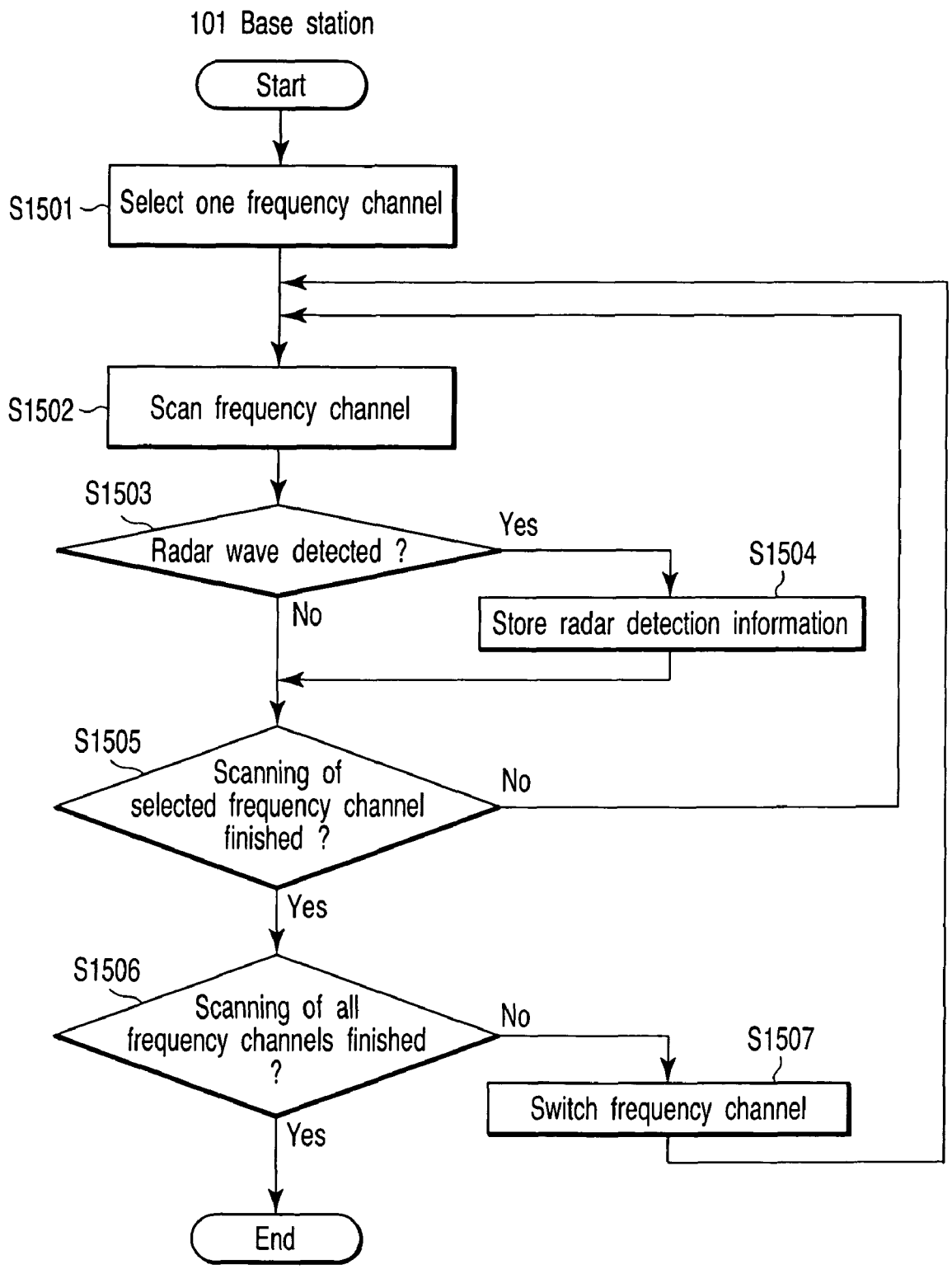
FIG. 15 is a flowchart illustrating a process example for frequency scanning performed by the base station of FIG. 14.

FIG. 15 is a flowchart illustrating a process example for frequency scanning performed by the base station 101 of FIG. 14.

The radar detection unit 1401 detects a radar wave, generates radar detection information, and stores the radar detection information in the radar information management unit 311.

The frequency channel control unit 314 selects one frequency channel from a plurality of frequency channels supported by the base station 101, and makes setting for enabling the analog section 302 and modulation/demodulation unit 308 to transmit and receive signals through the selected frequency channel (step S1501). After the setting for the analog section 302 and modulation/demodulation unit 308, the base station 101 scans the selected frequency channel (step S1502). This scan process includes, for example, a determination as to whether there is any other radio communication network that uses the selected frequency channel, or whether a radar wave is now being transmitted in the selected frequency channel.

If the radar detection unit 1401 detects a radar wave by frequency channel scanning at step S1503, the program proceeds to step S1504, whereas if no radar wave is detected at step S1503, the program proceeds to step S1505. At step S1504, the radar information management unit 311 stores radar detection information. At step S1505, the timer 316, for example, measures time, and the frame generation unit 313, for example, determines from the measured time whether scanning of one frequency channel is finished. If it is determined that the scan is finished, the program proceeds to step S1506, whereas if the scan is not finished, the program returns to step S1502.

At step S1506, it is determined whether all frequency channels are scanned. If all frequency channels are scanned, the scan process of FIG. 15 is finished, whereas if not all frequency channels are scanned, the program proceeds to step S1507. At step S1507, the frequency channel is switched to the next one, followed by the program returning to step S1502.

As described above, detection of a radar wave performed by frequency channel scanning before the base station 101 starts communication with each first terminal station 102a, 102b or 102c, or each second terminal station 103a, 103b or 103c enables radar detection information to be acquired before communication therebetween. Further, since no frames are transmitted therebetween during frequency channel scanning, the accuracy of radar detection is enhanced.

Figure 16:
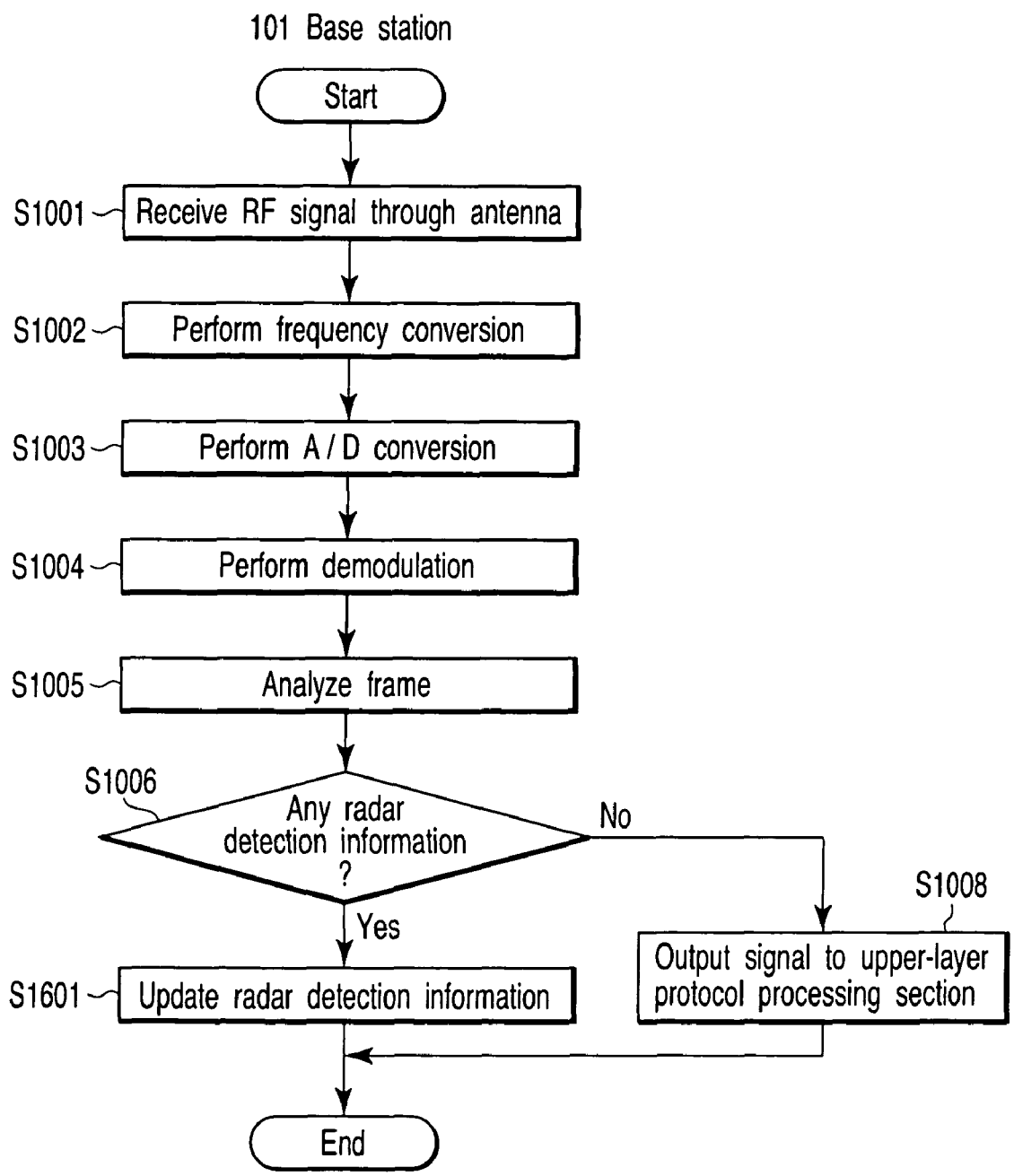
FIG. 16 is a flowchart illustrating a process example performed by the base station of FIG. 14 from the time when it receives a frame, to the time when it updates radar occurrence information.

The radar detection information collected by the base station 101 through frequency channel scanning may be updated using the radar detection information received from each first terminal station 101a, 101b or 101c after communication with each first terminal station starts. FIG. 16 is a flowchart illustrating a process example performed by the base station 101 from the time when it receives a frame, to the time when it updates radar occurrence information. In FIGS. 16 and 10, like reference numerals denote like steps, and no description is given thereof.

At step S1006, the received-information distribution unit 310 determines whether the received information contains radar detection information. If the received information contains radar detection information, the program proceeds to step S1601, whereas if the radar detection information is not contained, the program proceeds step S1008.

At step S1601, the received-information distribution unit 310 outputs the radar detection information to the radar information management unit 311, and the radar information management unit 311 updates the stored radar detection information using the received one.

Thus, the radar detection information collected by the base station 101 through frequency channel scanning is updated using the radar detection information received from each first terminal station 101a, 101b or 101c, with the result that the base station 101 can always provide the newest radar occurrence information.

Figure 17:
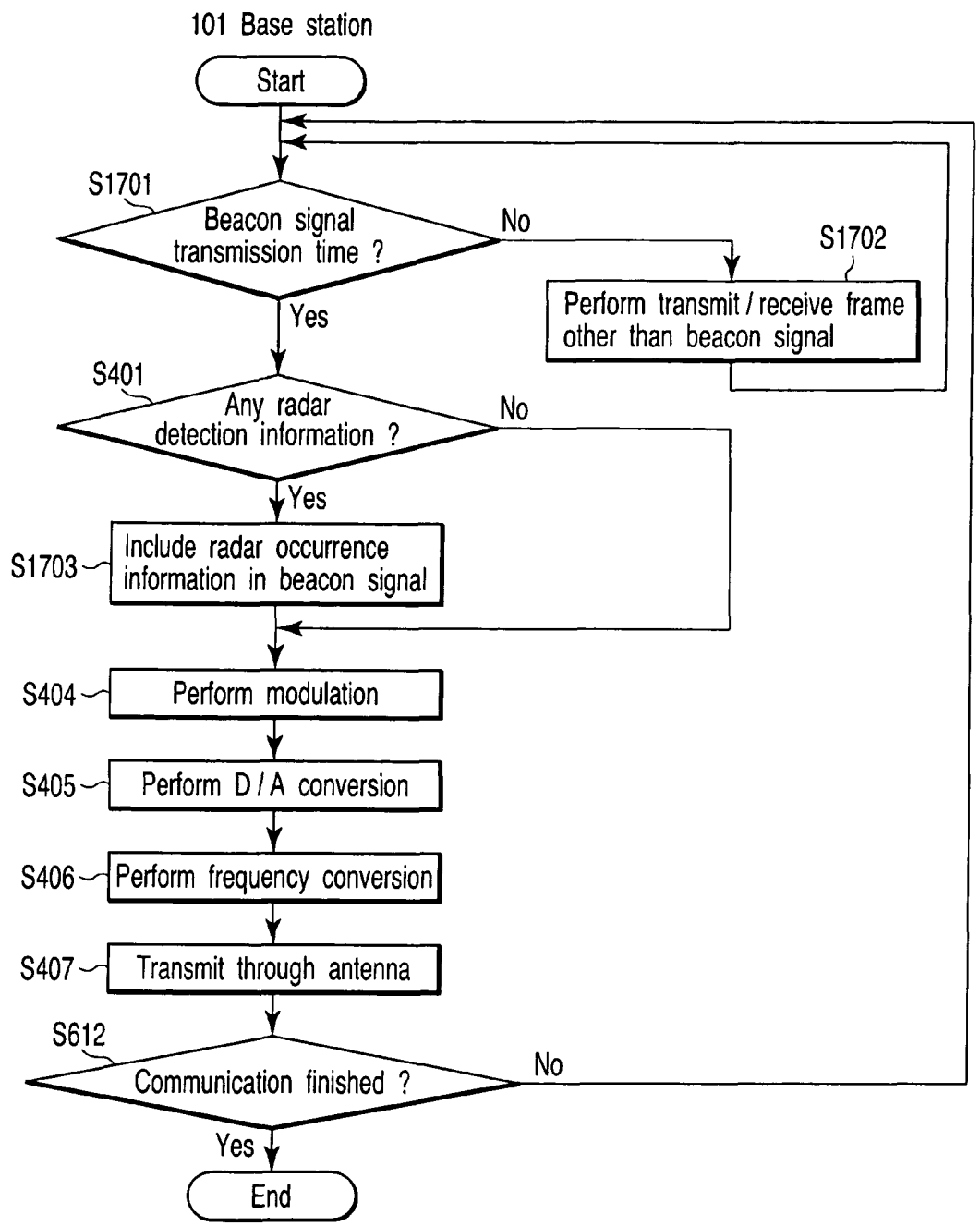
FIG. 17 is a flowchart illustrating a process example performed by the base station of FIG. 3 or 14 for including radar occurrence information in a beacon signal and supplying the information.

FIG. 17 is a flowchart illustrating a process example performed by the base station 101 for including radar occurrence information in a beacon signal and supplying the information. In FIGS. 17 and 4, like reference numeral denote like steps, and no description is given thereof.

The transmission timing control unit 315 determines whether now is the time when a beacon signal is to be transmitted. If it is determined that now is the time when a beacon signal is to be transmitted (step S1701), the program proceeds to step S401, whereas if now is not the time, the program proceeds to step S1702.

At step S1702, frames other than the beacon signal is transmitted or received, followed by the program returning to step S1701. If the frame generation unit 313 determines at step S401 that the radar information management unit 311 stores radar detection information, the program proceeds to step S1703, whereas if no radar detection information is stored, the program proceeds to step S404.

At step S1703, the frame generation unit 313 includes radar occurrence information into the beacon signal based on the radar detection information. After that, the base station 101 executes steps S404 to S407. If the communication is not yet finished, the program returns to step S1701, whereas if the communication is finished, the process of FIG. 17 is finished.

Thus, by including radar occurrence information into a beacon signal, the radar occurrence information can be reliably transmitted to each terminal station.

Further, the radar occurrence information transmitted at a time by the base station 101 may contain a plurality of radar occurrence information elements. Each radar occurrence information element is radar occurrence information generated by the base station 101 and indicating the corresponding radar wave.

If radar waves occur in short periods, a plurality of radar waves occur during a single beacon interval. In this case, it is sufficient if a plurality of radar occurrence information elements are included in a single beacon signal and transmitted at a time.

Figure 18:
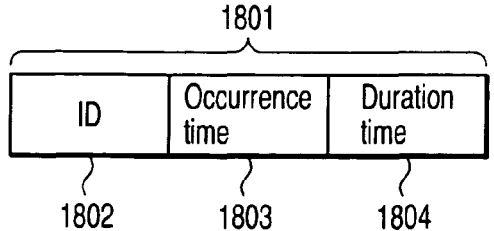
FIG. 18 is a view illustrating a format example of a radar occurrence information element transmitted by the base station.

FIG. 18 is a view illustrating a format example of a radar occurrence information element transmitted by the base station 101.

The format 1801 for a radar occurrence information element, shown in FIG. 18, comprises "ID" 1802 for identifying the radar occurrence information element, "Occurrence Time" 1803 indicating the time when the radar wave indicated by the information element has occurred, and "Duration Time" 1804 indicating the time during which the occurrence of the radar wave continues. The radar occurrence information includes one or more radar occurrence information elements.

"Occurrence Time" 1803 indicates the radar occurrence time computed by the base station 101 based on a plurality of radar detection information elements, and may be the value of, for example, the TSF timer. "Duration Time" 1804 indicates the time acquired by, for example, adding an offset value to "Duration Time" 1304 included in a radar detection information element supplied from each first terminal station 102a, 102b or 102c.

As described above, by supplying, as a radar occurrence information element, detailed information concerning an occurred radar wave, the base station 101 can provide each first terminal station 102a, 102b or 102c with accurate radar occurrence information, thereby enabling communication without interfering with radar waves even in the second frequency channel.

FIG. 19 is a view illustrating another format example of the radar occurrence information element transmitted by the base station 101.

The format 1901 for a radar occurrence information element, shown in FIG. 19, comprises "ID" 1902 for identifying the radar occurrence information element, "Occurrence Time" 1903 indicating the time when the radar wave indicated by the information element has occurred, "Duration Time" 1904 indicating the time during which the occurrence of the radar wave continues, and "Occurrence Period" 1905 indicating the period of occurrence of the radar wave.

"Occurrence Time" 1903 indicates the time when the next radar wave occurs, computed by the base station 101 based on a plurality of radar detection information elements, and may be the value of, for example, the TSF timer. "Duration Time" 1904 indicates the time acquired by, for example, adding an offset value to "Duration Time" 1304 included in a radar detection information element supplied from each first terminal station 102a, 102b or 102c. "Occurrence Period" 1905 indicates the period of occurrence of the radar wave, computed by the base station 101 based on a plurality of radar detection information elements.

As described above, by further including the periods of occurrence of radar waves in the radar occurrence information element, more effective radar occurrence information can be supplied.

FIG. 20 shows an example of the radar occurrence information transmitted by the base station 101.

The radar occurrence information 2001 shown in FIG. 20 comprises includes, for example, two radar occurrence information elements 2002 and 2003. The radar occurrence information elements 2002 and 2003 include radar occurrence information element IDs 2004 and 2008, terminal station IDs 2005 and 2009, radar occurrence times 2006 and 2010, and radar duration times 2007 and 2011, respectively.

The radar occurrence information element IDs 2004 and 2008 are used to identify the radar occurrence information elements. The terminal station IDs 2005 and 2009 are, for example, MAC addresses for identifying terminal stations. The terminal stations corresponding to the terminal station IDs have detected the respective radar waves indicated by the radar occurrence information elements. The radar occurrence times 2006 and 2010 indicate the times when the radar waves have occurred, and are, for example, the values of the TSF timer. The radar duration times 2007 and 2011 indicate the times acquired by, for example, adding an offset value to "Duration Time" 1304 included in each radar detection information element supplied from first terminal stations.

Thus, the base station can determine the terminal station or terminals influenced by a radar wave or waves, from a radar occurrence information element or elements that contain a terminal station ID or IDs. Accordingly, the radar occurrence information can be used as criterion information for selecting a terminal to be accessed through the second frequency channel. For instance, the terminal stations with IDs that are not included in the terminal station ID(s) of the radar occurrence information are free from the influence of radar waves, therefore can directly access each other.

Although in the above example, the radar occurrence information includes two radar occurrence information elements, there are no limitations to the number of the radar occurrence information elements included in the information.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A radio communication system comprising:
a terminal station including:
  a detection unit configured to detect a radar wave transmitted through a first frequency channel, the first frequency channel and a second frequency channel through which the radar wave fails to be transmitted being simultaneously utilized or one of the first frequency channel and the second frequency channel being utilized;
  a detection information generation unit configured to generate radar detection information including information indicating a detection time when the detection unit detects the radar wave, and information indicating the frequency channel through which the radar wave is transmitted; and
  a detection information transmission unit configured to transmit the radar detection information; and
a base station including:
  a detection information receiving unit configured to receive the radar detection information;
  an occurrence information generation unit configured to generate radar occurrence information based on the received radar detection information, the radar occurrence information including information indicating an occurrence time when the radar wave occurs, information indicating a period of occurrence of the radar wave, and information indicating the frequency channel through which the radar wave is transmitted; and
  an occurrence information transmission unit configured to transmit the radar occurrence information;
the terminal station further including:
  an occurrence information receiving unit configured to receive the radar occurrence information; and
  a communication unit configured to communicate with other terminal stations through the first frequency channel without using the base station when the radar wave fails to occur, based on the received radar occurrence information;
wherein the detection information transmission unit transmits the radar detection information simultaneously using the first frequency channel and the second frequency channel, or using the second frequency channel.

2. A radio communication system comprising:
a terminal station including:
  a detection unit configured to detect a radar wave transmitted through a first frequency channel, the first frequency channel and a second frequency channel through which the radar wave fails to be transmitted being simultaneously utilized or one of the first frequency channel and the second frequency channel being utilized;
  a detection information generation unit configured to generate radar detection information including information indicating a detection time when the detection unit detects the radar wave, and information indicating the frequency channel through which the radar wave is transmitted; and
  a detection information transmission unit configured to transmit the radar detection information; and
a base station including:
  a detection information receiving unit configured to receive the radar detection information;
  an occurrence information generation unit configured to generate radar occurrence information based on the received radar detection information, the radar occurrence information including information indicating an occurrence time when the radar wave occurs, information indicating a period of occurrence of the radar wave, and information indicating the frequency channel through which the radar wave is transmitted; and
  an occurrence information transmission unit configured to transmit the radar occurrence information;
the terminal station further including:
  an occurrence information receiving unit configured to receive the radar occurrence information;
  a communication unit configured to communicate with other terminal stations through the first frequency channel without using the base station when the radar wave fails to occur, based on the received radar occurrence information;
wherein the base station further includes:
  a scan unit configured to scan sequentially a plurality of third frequency channels supported by the base station;

a detection unit configured to detect a radar wave in each of the third frequency channels; and a detection information generation unit configured to generate radar detection information which includes information indicating a detection time when the detection unit detects the radar wave, and information indicating the frequency channel in which the radar wave occurs, and wherein the occurrence information generation unit refers to the radar detection information generated in the base station to generate the radar occurrence information.

3. The system according to claim 2, wherein the base station further includes an update unit configured to update the radar occurrence information generated in the base station referring to the radar detection information generated in the base station, using the radar detection information received from the terminal station.

4. A radio communication method comprising:

detecting, in a terminal station, a radar wave transmitted through a first frequency channel, the first frequency channel and a second frequency channel through which the radar wave fails to be transmitted being simultaneously utilized or one of the first frequency channel and the second frequency channel being utilized;

generating, in the terminal station, radar detection information including information indicating a detection time when detecting the radar wave, and information indicating the frequency channel through which the radar wave is transmitted;

transmitting the radar detection information from the terminal station;

receiving the radar detection information by a base station;

generating radar occurrence information by the base station based on the received radar detection information, the radar occurrence information including information indicating an occurrence time when the radar wave occurs, information indicating a period of occurrence of the radar wave, and information indicating the first frequency channel through which the radar wave is transmitted;

transmitting the radar occurrence information from the base station;

receiving the radar occurrence information by the terminal station; and accessing other terminal stations by the terminal station through the first frequency channel without using the base station when the radar wave fails to occur, based on the received radar occurrence information;

wherein the transmitting the radar detection information includes transmitting the radar detection information simultaneously using the first frequency channel and the second frequency channel, or using the second frequency channel.

5. A radio communication method comprising:

detecting, in a terminal station, a radar wave transmitted through a first frequency channel, the first frequency channel and a second frequency channel through which the radar wave fails to be transmitted being simultaneously utilized or one of the first frequency channel and the second frequency channel being utilized;

generating, in the terminal station, radar detection information including information indicating a detection time when detecting the radar wave, and information indicating the frequency channel through which the radar wave is transmitted;

transmitting the radar detection information from the terminal station;

receiving the radar detection information by a base station;

generating radar occurrence information by the base station based on the received radar detection information, the radar occurrence information including information indicating an occurrence time when the radar wave occurs, information indicating a period of occurrence of the radar wave, and information indicating the first frequency channel through which the radar wave is transmitted;

transmitting the radar occurrence information from the base station;

receiving the radar occurrence information by the terminal station;

accessing other terminal stations by the terminal station through the first frequency channel without using the base station when the radar wave fails to occur, based on the received radar occurrence information;

scanning sequentially, by the base station, a plurality of third frequency channels supported by the base station;

detecting a radar wave in each of the third frequency channels by the base station; and generating, by the base station, radar detection information which includes information indicating a detection time when the radar wave is detected, and information indicating the frequency channel in which the radar wave occurs, and wherein the generating the occurrence information includes generating the radar occurrence information referring to the radar detection information generated in the base station.

6. The method according to claim 5, further comprising updating, by the base station, the radar occurrence information generated in the base station referring to the radar detection information generated in the base station, using the radar detection information received from the terminal station.

* * * * *